(12) United States Patent
Ikeda et al.

(10) Patent No.: US 7,410,222 B2
(45) Date of Patent: Aug. 12, 2008

(54) TIRE-WHEEL ASSEMBLY

(75) Inventors: Toshiyuki Ikeda, Hiratsuka (JP); Katsuyoshi Sekine, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 141 days.

(21) Appl. No.: 10/576,858

(22) PCT Filed: Nov. 9, 2004

(86) PCT No.: PCT/JP2004/016562

§ 371 (c)(1),
(2), (4) Date: Apr. 21, 2006

(87) PCT Pub. No.: WO2005/047023

PCT Pub. Date: May 26, 2005

(65) Prior Publication Data

US 2007/0090682 A1    Apr. 26, 2007

(30) Foreign Application Priority Data

Nov. 12, 2003  (JP) ............................. 2003-382082

(51) Int. Cl.
*B60B 19/00* (2006.01)
*B60B 21/02* (2006.01)
(52) U.S. Cl. .................... 301/6.91; 152/381.3
(58) Field of Classification Search ............ 301/6.91; 152/381.3–381.6
See application file for complete search history.

(56) References Cited

U.S. PATENT DOCUMENTS

| 4,896,921 | A  | * | 1/1990  | Sato et al. ............... 301/5.1 |
| 6,074,015 | A  | * | 6/2000  | Renard et al. ............ 301/6.91 |
| 6,309,026 | B1 | * | 10/2001 | Svedhem ................. 301/6.91 |
| 6,648,421 | B1 | * | 11/2003 | Akiyoshi et al. ......... 301/6.91 |

FOREIGN PATENT DOCUMENTS

| JP | 64-090804    | 4/1989  |
| JP | 2000-158902  | 6/2000  |
| JP | 2001-97011   | 4/2001  |
| JP | 2002-187402  | 7/2002  |
| JP | 2002-293101  | 10/2002 |

OTHER PUBLICATIONS

Machine translation of foreign application JP 2002-187402 A.*

* cited by examiner

*Primary Examiner*—Jason R Bellinger
(74) *Attorney, Agent, or Firm*—Greer, Burns & Crain, Ltd.

(57) ABSTRACT

A tire-wheel assembly having a wheel with a rim and a pneumatic tire mounted on the rim, the pneumatic tire having a cavity inside for charging air. The pneumatic tire has a cavity's resonant frequency Fc arising from the cavity, and the wheel has a plurality of natural frequencies. The difference between the cavity's resonant frequency Fc of the pneumatic tire and the natural frequency Fw of the wheel closest to the cavity's resonant frequency is 10 Hz or more.

6 Claims, 2 Drawing Sheets

US 7,410,222 B2

TIRE-WHEEL ASSEMBLY

TECHNICAL FIELD

The present invention relates to a tire-wheel assembly having a pneumatic tire assembled on the rim of a wheel, and more particularly, to a tire-wheel assembly which can improve noise characteristics.

TECHNICAL BACKGROUND

In order to reduce road noise due to pneumatic tires, there have been conventionally proposed a variety of techniques including, for example, proper adjustment of the structure of the bead portions or sidewall portions thereof (see Patent Document 1, for example). However, there is a limit to reduce road noise with a tire alone, and it has been required to propose a new technique.

Patent Document 1: Japanese patent application Kokai publication No. 2001-97011

DISCLOSURE OF THE INVENTION

An object of the present invention is to provide a tire-wheel assembly capable of reducing road noise.

In order to achieve the above object, the present invention provides a tire-wheel assembly having a wheel with a rim and a pneumatic tire mounted on the rim, the pneumatic tire having a cavity inside for charging air, the pneumatic tire having a cavity's resonant frequency Fc arising from the cavity, the wheel having a plurality of natural frequencies, a difference between the cavity's resonant frequency Fc of the pneumatic tire and a natural frequency Fw of the wheel closest to the cavity's resonant frequency being 10 Hz or more.

According to the present invention, the difference of 10 Hz or more between the cavity's resonant frequency Fc of the pneumatic tire and the natural frequency Fw of the wheel closest thereto can moderate resonance therebetween, enabling the reduction of road noise.

BEST MODES FOR CARRYING OUT THE INVENTION

Embodiments of the present invention will be described in detail below with reference to the attached drawings.

Figure 1:
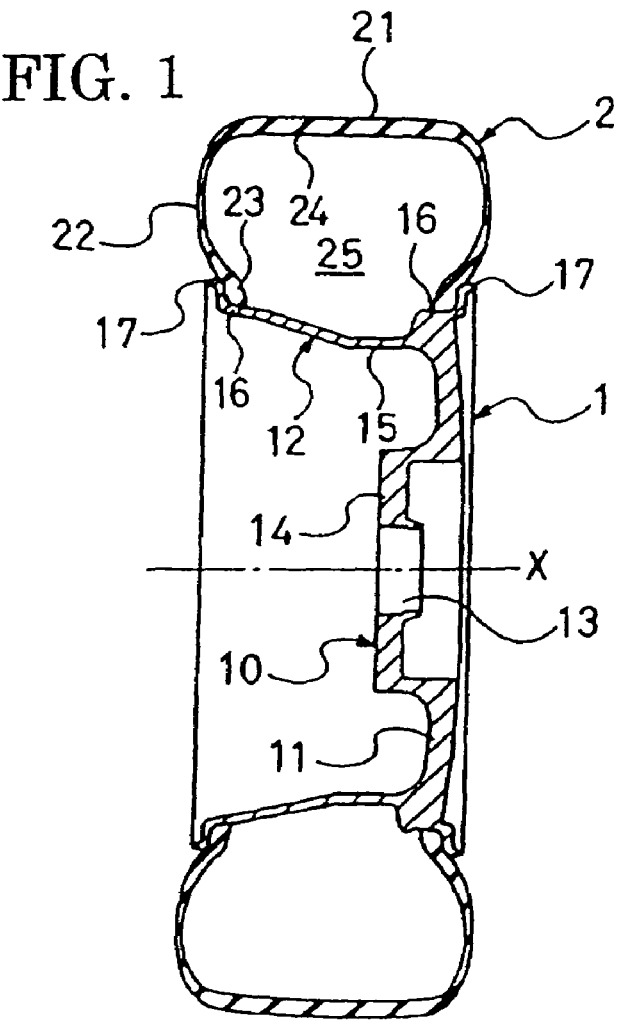
FIG. 1 is a cross-sectional view showing an embodiment of a tire-wheel assembly according to the present invention, taken in a plane that contains the center axis X of rotation thereof.

Referring to FIG. 1, there is shown an embodiment of a tire-wheel assembly according to the present invention; reference numeral 1 denotes a wheel, and reference numeral 2 denotes a pneumatic tire assembled on the wheel 1.

The wheel 1 has a disk 10 to be attached to an axle of a vehicle, and an annular rim 12 provided on the outer circumferential end of the disk 10. The disk 10 includes a boss 14 having in its center an attachment hole 13 that receives the vehicle axle, and a disk-shaped disk body 11 provided on the outer circumferential side of the boss 14. The rim 12 comprises a well portion 15 in the form of a recess that is connected to the outer circumferential side of the disk body 11, bead seat portions 16 connected to the opposite sides of the well portion 15, and flange portions 17 connected to the opposite sides of the bead seat portions 16.

The pneumatic tire 2 includes a tread portion 21, right and left sidewall portions 22 and right and left bead portions 23. The pneumatic tire 2 further includes a cavity 25 surrounded by the inner surface 24 of the pneumatic tire 2 for charging air. Although not shown in the drawing, the pneumatic tire 2 has a carcass ply that extends between the right and left bead portions 23, and its opposite ends are wrapped from the inner side of the tire toward the outer side thereof around bead cores embedded in the bead portions 23. A plurality of belt plies are provided radially outwardly of the carcass ply in the tread portion 21. The pneumatic tire 2 is assembled on the rim 12 of the wheel 1 by fitting the bead portions 23 of the pneumatic tire 2 to the bead seat portions 16 of the rim 12.

The pneumatic tire 2 has a cavity's resonant frequency Fc (Hz) arising from the cavity 25. The wheel 1 has a plurality of natural frequencies. The difference between the cavity's resonant frequency Fc of the pneumatic tire 2 and the natural frequency Fw (Hz) of the wheel 1 that is closest to the cavity's resonant frequency Fc is equal to or more than 10 Hz.

Specifically, a pneumatic passenger vehicle tire, for instance, has a cavity's resonant frequency Fc generated in a frequency range of about 200 to 250 Hz. The wheel 1 has natural frequencies F generated in a plurality of frequency ranges. The cavity's resonant frequency Fc is taken 10 Hz or more away from the natural frequency Fw of the natural frequencies F closest to the cavity's resonant frequency Fc, or the closest natural frequency Fw is taken 10 Hz or more away from the cavity's resonant frequency Fc. Either the closest natural frequency Fw or the cavity's resonant frequency Fc may be higher or lower; it suffices for the difference between them to be 10 Hz or more.

The difference between the cavity's resonant frequency Fc of the pneumatic tire 2 and the closest natural frequency Fw of the wheel 1, described above, can be made by adequately arranging the material, shape or the like of the wheel 1, and/or by changing the cross-sectional area of the cavity 25 surrounded by the rim 12 and the inner surface 24 of the pneumatic tire 2. For example, by using a metal of a light material for the wheel 1, or by thickening the wheel 1 to increase its rigidity, the natural frequencies F of the wheel 1 can be removed to higher frequencies. By using a metal of a heavy material for the wheel 1, or by thinning the wheel 1 to reduce its rigidity, the natural frequencies F of the wheel 1 can be removed to lower frequencies. Also, by increasing the cross-sectional area of the cavity 25 in the radially inner region thereof to shorten the equivalent radius (length) of the cavity 25, the cavity's resonant frequency Fc of the pneumatic tire 2 can be removed to a higher frequency.

Figure 2:
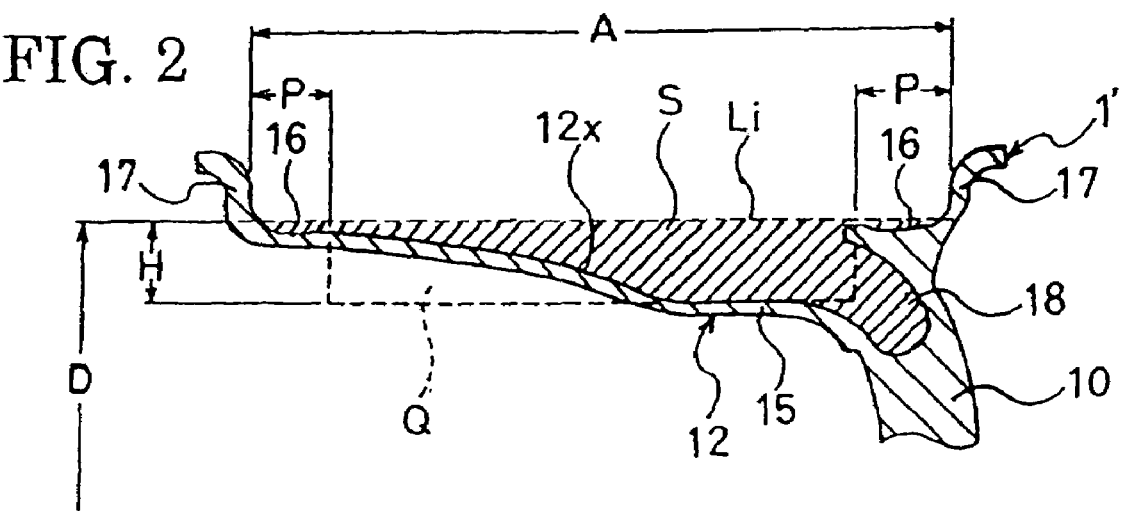
FIG. 2 is a partial enlarged cross-sectional view showing another example of a wheel.

In FIG. 2, an example of a wheel is shown that increases the cross-sectional area of the cavity 25 in the radially inner region thereof while having reduced rigidity. This wheel 1' has a recess 18 that is annularly formed along the circumferential direction of the wheel in the well portion 15 integrally connected to the outer circumferential end of the disk 10, the recess extending to the disk 10. The cross-sectional area of the cavity 25 in the radially inner region thereof increases by the cross-sectional area of the recess 18, and the rigidity of the part of the wheel 1' in which the recess is formed is reduced as the recess 18 is formed. As a result, the cavity's resonant frequency Fc of the pneumatic tire 2 is removed to a higher frequency, and the natural frequencies F of the wheel 1' are removed to lower frequencies, whereby the cavity's resonant frequency Fc of the pneumatic tire 2 is higher than the natural frequency Fw of the wheel 1' closest thereto.

As shown in FIG. 2, when the cross-sectional area of the cavity 25 in the radially inner region thereof is increased to make the cavity's resonant frequency Fc higher than the natural frequency Fw, a cross-sectional area S (mm$^2$) surrounded by a phantom straight line Li passing the position of the rim radius D and the radially outer surface 12x of the rim 12 in cross section shown in the drawing taken in a plane that contains the center axis X of rotation of the tire-wheel assembly (see FIG. 1) is preferably in the range of 80 to 150% of the area Q (mm$^2$) expressed by the following expression:

$$Q=(A\cdot 2P)\times H$$

where A is a rim width (mm), H is the depth (mm) of the well portion 15, and P is the width (mm) of the bead seat portion 16.

If the cross-sectional area S is less than 80% of the area Q, it is difficult for the difference between the cavity's resonant frequency Fc of the pneumatic tire 2 and the natural frequency Fw of the wheel 1 closest thereto to be 10 Hz or more. If the cross-sectional area S exceeds 150% of the area Q, it is difficult to produce a wheel that maintains a specified rim radius D.

Figure 3:
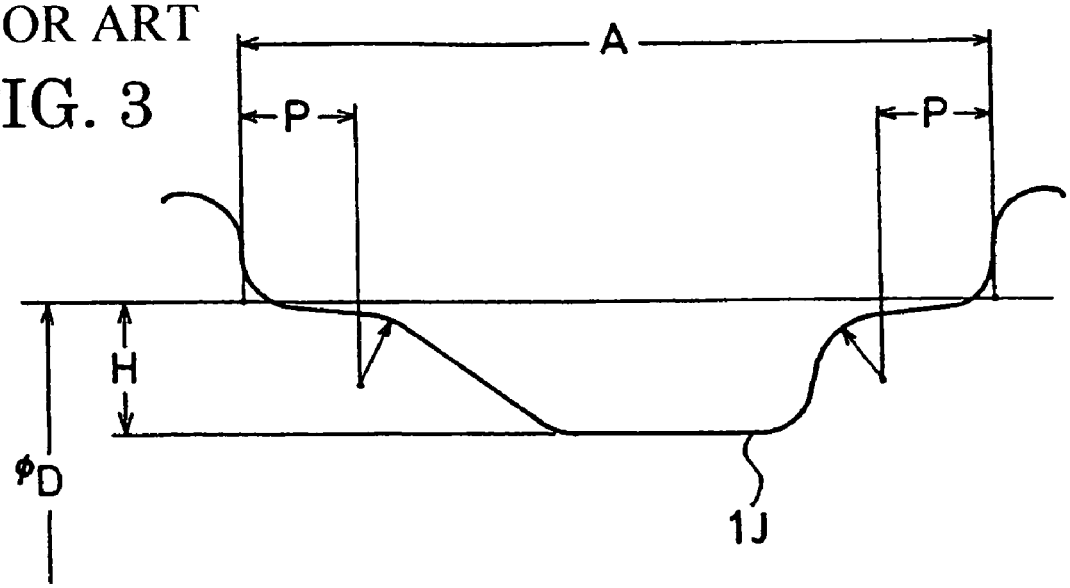
FIG. 3 is a schematic cross-sectional view showing an example of a JATMA standard rim.

It should be noted that the rim width A, the rim radius D, the width P of the bead seat portion 16, and the depth H of the well portion 15 shown in FIG. 2 are according to the specifications of symbol A, symbol (φD, symbol P, symbol H of a rim 1J that is shown in FIG. 3 as one example and specified in JATMA (JATMA YEAR BOOK 2003).

The present inventors noted a tire-wheel assembly comprising a wheel and a pneumatic tire mounted thereon through intense study on the reduction of road noise. The wheel has natural frequencies F produced in a plurality of frequency ranges. If one of the natural frequencies F is close to the peak of a vibration frequency caused by the tire, road noise is deteriorated because of resonance phenomenon between both frequencies. The pneumatic tire 2 has a cavity's resonant frequency Fc arising from the cavity 25, and the cavity's resonant frequency Fc is close to one of the natural frequencies F of the wheel 1, which increases resonance phenomenon, contributing to the deterioration of road noise.

Therefore, in the present invention, the difference between the cavity's resonant frequency Fc of the pneumatic tire 2 and the natural frequency Fw of the natural frequencies F closest thereto is made 10 Hz or more not to be close to each other, as described above. This moderates resonance phenomenon between the cavity's resonant frequency Fc of the pneumatic tire 2 and the natural frequency Fw of the natural frequencies F closest thereto, enabling the reduction of road noise.

If the difference between the cavity's resonant frequency Fc and the natural frequency Fw is less than 10 Hz, it is difficult to effectively reduce road noise. Preferably, the difference between the cavity's resonant frequency Fc and the natural frequency Fw is 20 Hz or more to further reduce road noise. The upper limit of the difference between the cavity's resonant frequency Fc and the natural frequency Fw can be 60 Hz. It is because the reduction effect is substantially the same even if the difference exceeds 60 Hz.

Figure 4:
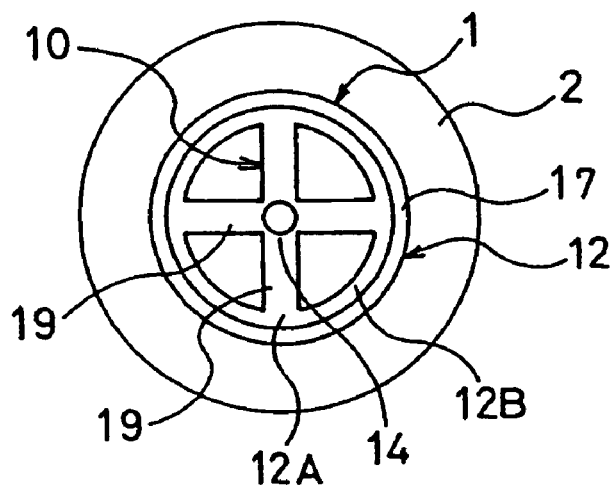
FIG. 4 is a side view showing another embodiment of a tire-wheel assembly according to the present invention.

In the present invention, in the case where the wheel 1 comprises a disk 10 having a boss 14 placed in its center and a plurality of rim support parts 19 radially placed from the boss 14 at equal intervals, and a rim 12 disposed radially outwardly of the rim support parts 19, as shown in FIG. 4, if the number K of the rim support parts 19 is odd, the difference between the frequency Fo (Hz) expressed by Fo=K×Fc and the natural frequency Fyo (Hz) of the wheel 1 closest thereto is preferably 5% or more; in other words, the natural frequency Fyo of the wheel 1 closest to the frequency Fo is preferably taken 5% or more away with respect to the frequency Fo. If the number K of the rim support parts 19 is even, the difference between the frequency Fe (Hz) expressed by Fe=K×Fc/2 and the natural frequency Fye (Hz) of the wheel 1 closest thereto is preferably 5% or more; in other words, the natural frequency Fye of the wheel 1 closest to the frequency Fe is preferably taken 5% or more away with respect to the frequency Fe.

In the wheel 1 having a rim 12 connected to the outer radially outer ends of the radially placed rim support parts 19, the rim 12 has portions 12A that are braced by the rim support parts 19 and are not easily vibrated, and portions 12B that are not braced thereby and are easily vibrated, the portions 12A and 12B being alternately present by the number K of the rim support parts 19, respectively. If the cycle (K cycles) of the portions 12A that are not easily vibrated and the portions 12B that are easily vibrated is identical to the period of a higher-order frequency component of the cavity's resonance, it is not preferable because the resonant action increases to thereby deteriorate road noise.

If the number K of the rim support parts 19 is even, the higher-order frequency component of the cavity's resonance having a period identical to the cycle of the portions 12A and 12B has the above frequency Fe expressed by Fe=K×Fc/2; therefore, the frequency Fe is taken away from the natural frequency Fye of the wheel 1 closest thereto.

If the number K of the rim support parts 19 is odd, the period of the cavity's resonance is not identical to the cycle of the portions 12A and 12B, because the period of the cavity's resonance is even; however, the period of the higher-order frequency component of the cavity's resonance having a frequency which is two times the frequency of the cavity's resonance is identical to the cycle of the portions 12A and 12B. Therefore, if the number K is odd, the frequency Fo is taken away from the natural frequency Fyo of the wheel 1 closest thereto because the higher-order frequency component of the cavity's resonance having a period identical to the cycle of the portions 12A and 12B has the above frequency Fo expressed by Fo=K×Fc.

If the percentage at which it is taken away therefrom is less than 5%, the improvement effect can not be obtained. The upper limit thereof is preferably 30% or less. It is because that is the limit at present, since another natural frequency is closer to the higher-order frequency component of the cavity's resonance even if the particular natural frequency Fye, Fyo of the wheel 1 is taken away from the higher-order frequency component of the cavity's resonance.

The frequency Fe, Fo can be taken away from the natural frequency Fye, Fyo of the wheel 1 closest thereto as follows. For example, the sensitivity of a natural frequency desired to be taken away to mass and rigidity of the wheel (percentage of change of the natural frequency in changing the mass and rigidity) is obtained through experimental modal analysis, analysis using a finite element method, or the like, and the material or thickness of the wheel 1 is changed according to the obtained results, whereby the natural frequency can be changed.

The difference between each frequency Fm (Hz) of higher-order frequency components of the cavity's resonance obtained by multiplying the cavity's resonant frequency Fc of the pneumatic tire 2 by integral multiples of two to five and the natural frequency Fx (Hz) of the wheel 1 closest to each frequency Fm of the higher-order frequency components is preferably 5% or more with respect to each frequency Fm of the higher-order frequency components; in other words, the natural frequency Fx of the wheel 1 closest to each frequency Fm of the higher-order frequency components is preferably taken away 5% or more with respect to each frequency Fm of the higher-order frequency component.

The important frequency in the noise transmitted to the inside of a vehicle from the tire is up to about 1 kHz, and as the order of the frequency component is higher, the affection thereon decreases. Accordingly, by making the difference between each frequency Fm of the higher-order frequency components of the cavity's resonance obtained by multiplying the cavity's resonant frequency Fc by integral multiples of two to five and the natural frequency Fx (Hz) of the wheel 1 closest to each frequency Fm of the higher-order frequency components 5% or more, road noise arising from the frequencies Fm of the higher-order frequency components can be reduced. The upper limit of the difference between each frequency Fm of the higher-order frequency components and the natural frequency Fx can be 20% because of the same reason as mentioned above.

Each frequency Fm of the higher-order frequency components can also be taken away from the natural frequency Fx (Hz) of the wheel 1 closest thereto in the same way as described above.

The present invention is preferably applicable to a tire-wheel assembly used for passenger cars in particular.

The natural frequencies F of the wheel 1 and the cavity's resonant frequency Fc of the pneumatic tire 2 of the tire-wheel assembly according to the present invention are measured as follows.

Referring first to the natural frequencies F of the wheel 1, the wheel 1 alone is fixed to a shaft formed of a rigid material, vibration is applied to the disk 10 from the widthwise direction of the wheel 1, and vibration generated near the point to which the vibration has been applied is measured to read frequencies showing the peaks of a transfer function obtained through frequency analysis. Also, vibration is applied to the flange portion 17 of the rim 12 from the radial direction of the wheel 1 to read frequencies showing the peaks as described above. The read frequencies are the natural frequencies F of the wheel 1.

Referring then to the cavity's resonant frequency Fc of the pneumatic tire 2, a tire-wheel assembly (tire-wheel assembly for passenger cars) where an air pressure of 180 kPa has been applied to the pneumatic tire 2 is hung in the air with a rubber band, vibration is applied to the center of the tread portion 21 from the radial direction of the tire, and vibration generated near the wheel center is measured to read a frequency showing the peak of a transfer function obtained through frequency analysis. The read frequency is the cavity's resonant frequency Fc of the pneumatic tire 2.

EXAMPLE

Prepared were tire-wheel assemblies according to the present invention tire-wheel assemblies 1 to 7 (examples 1 to 7) and comparison tire-wheel assemblies 1 and 2 (comparative examples 1 and 2), each having a wheel with a 15×6½JJ sized rim and a 195/60R15 sized tire, in which the cavity's resonant frequency Fc (Hz) of the pneumatic tire, the natural frequency Fw (Hz) of the wheel (the number K of the rim support parts is five) closest to the cavity's resonant frequency, the difference between the cavity's resonant frequency Fc (Hz) and the natural frequency Fw, the difference (%) between the frequency Fo (Hz) and the natural frequency Fyo (Hz), the difference (minimum value) (%) between each frequency Fm of the higher-order frequency components and the natural frequency Fx (Hz) closest thereto were as shown in Table 1.

The natural frequency Fw of each of the present invention tire-wheel assemblies 1 to 7 and the comparison tire-wheel assemblies 1 and 2 was changed by adjusting the thickness of the wheel. The present invention tire-wheel assembly 7 has a wheel with a construction shown in FIG. 2. The ratio S/Q of the cross-sectional area S to the area Q of each of the present invention tire-wheel assemblies 1 to 6 and comparison tire-wheel assemblies 1 and 2 is 69%, and the ratio S/Q of the cross-sectional area S to the area Q of the present invention tire-wheel assembly 7 is 91%. The air pressure applied to each is 180 kPa.

The test tire-wheel assemblies were mounted on a passenger car (FF vehicle) of two litter displacement; evaluation testing for road noise was carried out according to the following measurement method, obtaining the results shown in Table 1.

Road Noise

Feeling testing was conducted on a test course by a test driver, evaluating the results on a ten-point scale. As the value is greater, road noise is lower.

TABLE 1

|  | Fc (Hz) | Fw (Hz) | Difference (Hz) between Fc and Fw | Difference (Hz) between Fo and Fyo | Difference (Hz) between Fm and Fx | Road Noise |
| --- | --- | --- | --- | --- | --- | --- |
| Comparative Example 1 | 234 | 225 | 9 | 2 | 1 | 5 |
| Comparative Example 2 | 234 | 242 | 8 | 3 | 2 | 5 |
| Example 1 | 234 | 245 | 11 | 2 | 3 | 5.5 |
| Example 2 | 234 | 255 | 21 | 4 | 4 | 6 |
| Example 3 | 234 | 291 | 57 | 2 | 3 | 7 |
| Example 4 | 234 | 300 | 66 | 3 | 2 | 7 |
| Example 5 | 234 | 254 | 20 | 6 | 4 | 6.5 |
| Example 6 | 234 | 255 | 21 | 7 | 6 | 7 |
| Example 7 | 237 | 216 | 21 | 6 | 6 | 7 |

From Table 1, it is understood that the present invention tire-wheel assemblies in which the differences between the cavity's resonant frequencies Fc (Hz) of the pneumatic tires and the natural frequencies Fw (Hz) of the wheels closest thereto can reduce road noise.

From the present invention tire-wheel assemblies 2 and 5 (examples 2 and 5), it is understood that the present invention tire-wheel assembly 5 in which the difference between the frequency Fo and the natural frequency Fyo is in the range of 5% or more can further reduce road noise than the present invention tire-wheel assembly 2 in which the difference between the frequency Fo and the natural frequency Fyo is in the range that is less than 5%.

From the present invention tire-wheel assemblies 5 and 6 (examples 5 and 6), it is understood that the present invention tire-wheel assembly 6 in which the difference between the frequency Fm of the higher-order frequency component and the natural frequency Fx is in the range of 5% or more can further reduce road noise.

INDUSTRIAL APPLICABILITY

The present invention having the aforementioned excellent effect is very effectively applicable to a tire-wheel assembly to be mounted on passenger cars in particular.

What is claimed is:

1. A tire-wheel assembly having a wheel with a rim and a pneumatic tire mounted on the rim, the pneumatic tire having a cavity inside for inflation with air, the pneumatic tire having a resonant frequency (Fc) arising from the cavity, the wheel having a plurality of natural frequencies including a natural wheel frequency (Fw) closest to (Fc) wherein the difference between the resonant frequency (Fc) and the natural wheel frequency Fw is 10 Hz or more.

2. A tire-wheel assembly according to claim 1, wherein the difference between the resonant frequency (Fc) and the natural wheel frequency (Fw) is 20 to 60 Hz.

3. A tire-wheel assembly according to claim 1, wherein the rim comprises a well portion, bead seat portions connected to both sides of the well portion, and flange portions connected to both sides of the bead seat portions, a cross-sectional area (S)(mm$^2$) surrounded by a phantom straight line (Li) passing a position of radius (D) of the rim and a radially outer surface of the rim in cross section taken in a plane that contains a center axis of rotation of the tire-wheel assembly being in a range of 80 to 150% of an area (Q)(mm$^2$) expressed by a following expression:

$$Q=(A-2P)\times H$$

where (A) is a rim width (mm), (H) is a depth (mm) of the well portion, and (P) is a width (mm) of the bead seat portion, the resonant frequency (Fc) being greater than the natural wheel frequency (Fw).

4. A tire-wheel assembly according to claim 3, wherein the wheel has a disk with an outer circumferential end to which the well portion of the rim is connected, the well portion having a recess annularly formed in a circumferential direction of the wheel therein, the recess extending to the disk.

5. A tire-wheel assembly according to claim 1, wherein the wheel includes a disk having a boss placed in a center thereof and a plurality of rim support parts (K) radially extending from the boss, and the rim disposed radially outwardly of the rim support parts (K), a natural frequency (Fyo) of the wheel closest to a frequency (Fo) expressed by the equation Fo=(K)×Fc is at least 5% away from (Fo) if (K) is odd, a natural frequency (Fye) of the wheel closest to a frequency (Fe) expressed by the equation Fe=(K)×Fc/2 is at least 5% away from (Fe) if (K) is even.

6. A tire-wheel assembly according to claim 1, wherein the pneumatic tire has higher order cavity resonance frequencies (Fm) obtained by multiplying the resonant frequency (Fc) by integral multiples of two to five, wherein further a second natural wheel frequency (Fx) is at least 5% away from the closest (Fm).

* * * * *